(12) United States Patent
Eisengruber et al.

(10) Patent No.: US 8,272,488 B2
(45) Date of Patent: Sep. 25, 2012

(54) OVERRUNNING COUPLING AND CONTROL ASSEMBLY INCLUDING APPARATUS HAVING A LATCHING MECHANISM

(75) Inventors: Gregory M. Eisengruber, Saginaw, MI (US); Terry O. Hendrick, Cass City, MI (US); Jeffrey C. Hoppe, Cass City, MI (US); Robert D. Fetting, Caro, MI (US); Joshua A. Bukoffsky, Clio, MI (US)

(73) Assignee: Means Industries, Inc., Saginaw, MI (US)

( * ) Notice: Subject to any disclaimer, the term of this patent is extended or adjusted under 35 U.S.C. 154(b) by 454 days.

(21) Appl. No.: 12/696,781

(22) Filed: Jan. 29, 2010

(65) Prior Publication Data

US 2010/0200358 A1 Aug. 12, 2010

Related U.S. Application Data

(60) Provisional application No. 61/206,972, filed on Feb. 6, 2009.

(51) Int. Cl.
*F16D 41/12* (2006.01)
(52) U.S. Cl. ........ 192/46; 192/47; 192/69.1; 192/85.18; 192/114 R
(58) Field of Classification Search ................... 192/69.1
See application file for complete search history.

(56) References Cited

U.S. PATENT DOCUMENTS

| | | | |
|---|---|---|---|
| 2,947,537 A | | 8/1960 | Littell et al. |
| 2,959,062 A | | 11/1960 | Looker |
| 4,050,560 A | * | 9/1977 | Torstenfelt ...................... 192/47 |
| 4,651,847 A | | 3/1987 | Hermanns |
| 5,927,455 A | | 7/1999 | Baker et al. |
| 6,193,038 B1 | | 2/2001 | Scott et al. |
| 6,244,965 B1 | | 6/2001 | Klecker et al. |

(Continued)

OTHER PUBLICATIONS

International Search Report and Written Opinion; International Application No. PCT/US2010/022690; mailed Mar. 31, 2010.

*Primary Examiner* — Rodney Bonck
(74) *Attorney, Agent, or Firm* — Brooks Kushman P.C.

(57) ABSTRACT

Overrunning coupling and control assemblies, each of which includes control apparatus having a latching mechanism are provided. Each latching mechanism prevents an actuator arm of an overrunning coupling assembly from moving in a first direction substantially parallel to a shift direction of a control plate of the coupling assembly within a housing slot in a locked condition of the mechanism in a first position of the control plate. A control pressure signal within a bore of the housing changes the condition of the latching mechanism from locked to unlocked to unlock the actuator arm and causes the unlocked actuator arm to move along the first direction within the slot and the control element to move along the shift direction to a second position. The control pressure signal also causes a piston which has a groove formed in its outer surface to receive and retain a free end portion of the actuator arm to slide within the bore in the housing against the biasing force of the at least one biasing member. In the absence of a control pressure signal, the at least one biasing member moves the piston and thereby the unlocked actuator arm in a second direction opposite the first direction within the slot and the control element along the shift direction from the second position back to the first position and changes the condition of the latching mechanism from unlocked to locked to lock the actuator arm.

20 Claims, 13 Drawing Sheets

U.S. PATENT DOCUMENTS

| | | |
|---|---|---|
| 6,290,044 B1 | 9/2001 | Burgman et al. |
| 6,905,009 B2 * | 6/2005 | Reed et al. .................. 192/43.1 |
| 7,198,587 B2 | 4/2007 | Samie et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,464,801 B2 | 12/2008 | Wittkopp |
| 7,484,605 B2 | 2/2009 | Pawley et al. |
| 8,061,496 B2 * | 11/2011 | Samie et al. .................. 192/47 |
| 2004/0238306 A1 | 12/2004 | Reed et al. |
| 2006/0185957 A1 * | 8/2006 | Kimes et al. .................. 192/46 |
| 2007/0034470 A1 | 2/2007 | Fetting, Jr. et al. |
| 2007/0278061 A1 | 12/2007 | Wittkopp et al. |
| 2008/0110715 A1 | 5/2008 | Pawley |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0159391 A1 | 6/2009 | Eisengruber |
| 2009/0211863 A1 | 8/2009 | Kimes |

* cited by examiner

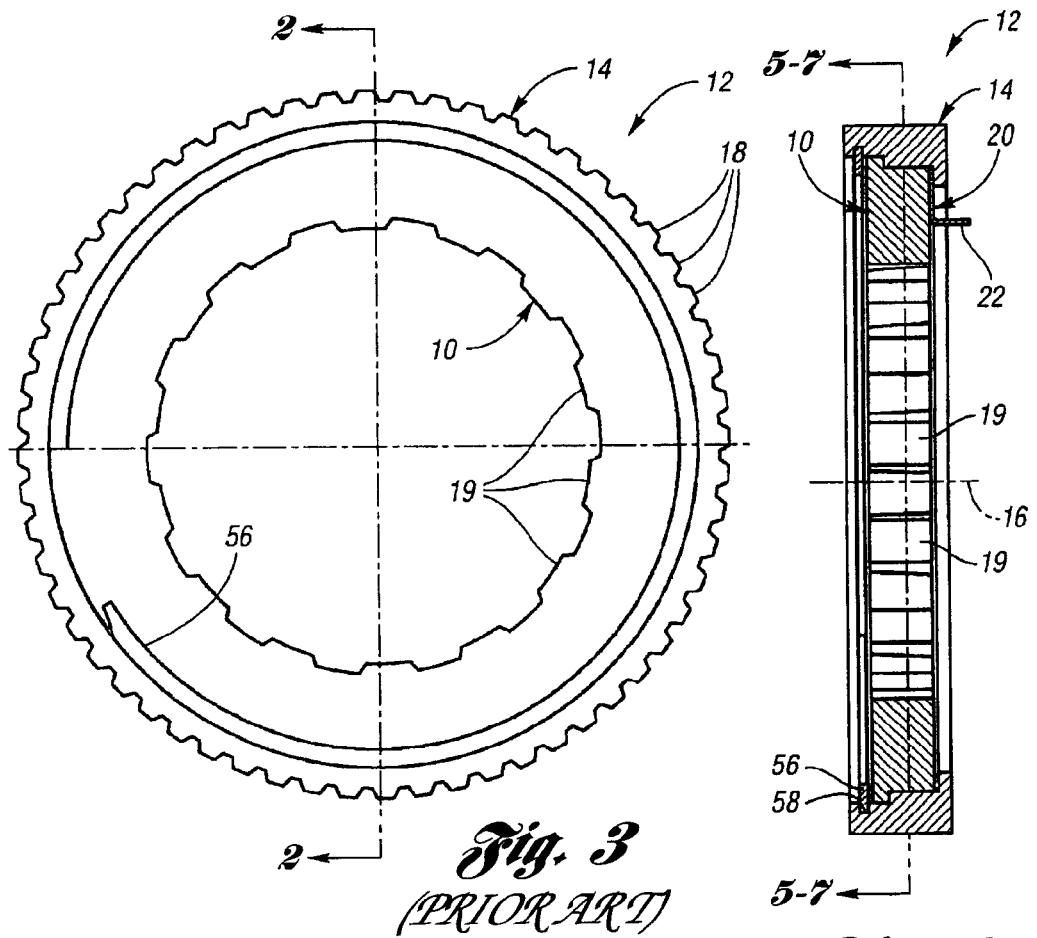
*Fig. 3*
(PRIOR ART)
*Fig. 4*
(PRIOR ART)
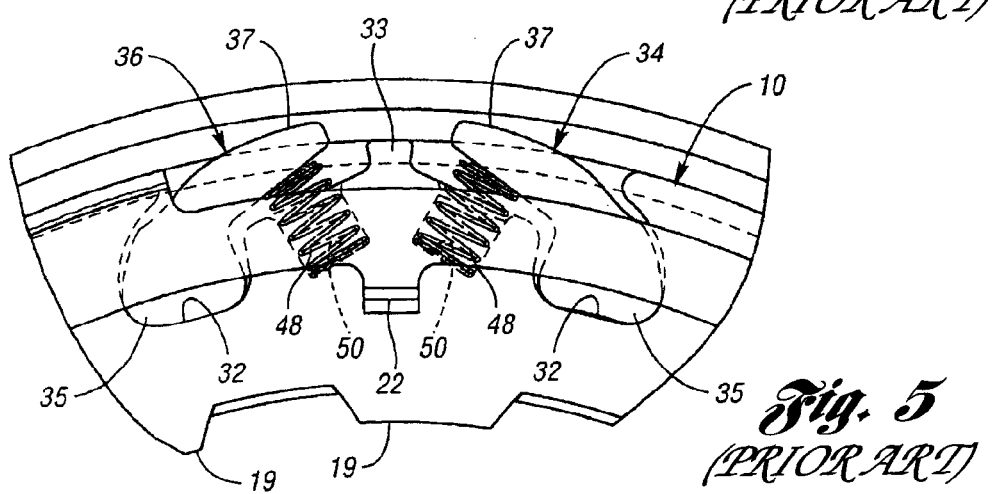
*Fig. 5*
(PRIOR ART)

OVERRUNNING COUPLING AND CONTROL ASSEMBLY INCLUDING APPARATUS HAVING A LATCHING MECHANISM

CROSS-REFERENCE TO RELATED APPLICATION

This application claims the benefit of U.S. provisional application Ser. No. 61/206,972 filed Feb. 6, 2009.

BACKGROUND OF THE INVENTION

1. Field of the Invention

This invention relates to overrunning coupling and control assemblies, each of which includes apparatus having a latching mechanism.

2. Background Art

One-way clutches are commonly employed in automatic transmissions for automobiles. A one-way clutch allows a first clutch plate to free-wheel in a first rotational direction relative to a second clutch plate, and to clutch in a second rotational direction. Examples include roller clutches and sprag clutches.

It may be desirable to have the one-way clutching mode operable only upon demand, such that it is in free-wheeling mode in both directions until the one-way clutching is selectively actuated. There are different means of selecting when the free-wheeling stops and one-way clutching begins.

U.S. Pat. No. 7,258,214 discloses, with reference to FIG. 1, a pocket plate, generally indicated at 10, of a planar or overrunning coupling or clutch assembly, generally indicated at 12. A driving coupling or notch plate, generally indicated at 14, is nested within the pocket plate 10. The driving notch plate 14 is to be drivably connected to a torque input shaft (not shown). This driving connection is established by internal splines 16 formed on the driving notch plate 14, which drivably engage external splines on the input shaft. The pocket plate 10 is provided with external splines 18.

An actuator (not shown) may be drivably connected to a slide or control plate, generally indicated at 20, via a slide plate fork 22, which is secured to a tab 23 of the control member or plate 20, thereby causing the control plate 20 to be adjusted angularly with respect to the axis of the input shaft (which corresponds to a first axis 24 about which the plates 14 and 20 are rotatable. The control plate 20 is disposed between the plates 10 and 14 for limited angular rotation relative to the plates 10 and 14. The plate 14 can free-wheel in both angular directions about the axis 24 relative to the plate 10. The bi-directional free-wheeling motion is achieved in an operating mode when the actuator adjusts the angular position of the control plate 20 relative to the pocket plate 10 (via the fork 22) about the axis 24 to a position (i.e., overrun or disengaged position). An angular position (i.e., locked or engaged position) of the control plate 20 relative to the pocket plate 10 is also provided.

U.S. Pat. No. 7,344,010 discloses in its FIG. 1 (labeled as FIG. 2 in this application) a pocket member or plate, generally indicated at 10, of a planar or overrunning coupling or clutch assembly, generally indicated at 12. A coupling or notch plate, generally indicated at 14, is nested within the pocket plate 10. The notch plate 14 is to be connected to a part (not shown) via internal splines 16 formed on the notch plate 14, which engage splines on the part. The pocket plate 10 is provided with external splines 18. An actuator (not shown) may be drivably connected to a slide or control element or plate, generally indicated at 20, via a slide plate fork 22, which is secured to a tab 23 of the control member or plate 20, thereby causing the control plate 20 to be adjusted angularly with respect to a first axis 24 about which at least one of the plates 14 and 20 is rotatable. The control plate 20 is disposed between the plates 10 and 14 for limited angular rotation relative to the plates 10 and 14.

U.S. Pat. No. 7,484,605 discloses in its FIGS. 1-3 (labeled as FIGS. 3-5, respectively, in this application) a pocket plate or inner member, generally indicated at 10, of a overrunning radial coupling or clutch assembly, generally indicated at 12. An outer member or notch plate, generally indicated at 14, is mounted for rotation about a first axis 16 and is located adjacent the pocket plate 10 in radially inner and radially outer relationship. The notch plate 14 may be drivably connected to a source of torque (not shown). This driving connection is established by external splines 18 formed on the notch plate 14, which drivably engage splines on the source torque. The pocket plate 10 may be stationary or rotatable about the first axis 16 and is provided with internal splines 19. An actuator (not shown) may be drivably connected to a slide or control element or plate, generally indicated at 20, via a slide plate lever 22, which is connected to the control member or plate 20, thereby causing the control plate 20 to be adjusted angularly with respect to the first axis 16 (about which the plates 14 and 20 are rotatable). The control plate 20 is disposed between the plates 10 and 14 for limited angular rotation relative to and between the plates 10 and 14. The plate 14 can overrun or free-wheel in one angular direction about the axis 16 relative to the plate 10. The one-way free-wheeling motion is achieved in an operating mode when the actuator adjusts the angular position of the control plate 20 relative to the pocket plate 10 (via the lever 22) about the axis 16 to a first angular position (i.e., one-way overrun or disengaged position).

U.S. Pat. No. 6,290,044 discloses a selectable one-way clutch assembly for use in an automatic transmission comprising a strut plate rotatable about a central hub and having pockets and struts mounted therein for pivotable rotation. A selecting plate concentrically located about an activator hub has teeth extending axially inboard and configured to fit in the apertures in an activator plate. A turning device is selectively operable to activate a one-way clutching mode by rotating the pin of a control plate to disengage selecting cams and displace selecting plate teeth inboard beyond the inboard face of the activator plate wherein the struts catch the teeth when the strut plate assembly is rotated in a clutching direction. The turning device includes a hydraulic actuator having an actuating member with a small radial slot through which the pin extends, and a pressurizeable chamber. Upon pressurization, the actuating member is displaced along a tangent of the control plate and thus the pin is displaced rotationally. The actuator includes an actuator release spring to bias and return the actuating member towards the chamber. The turning device may also include an electrical solenoid to displace an actuating member as described above.

Other U.S. patent publications which disclose controllable or selectable one-way clutches include U.S. Pat. Nos. 5,927,455; 6,193,038; 6,244,965; 7,198,587; 7,275,628; and 7,464,801, and U.S. Publication Application Nos. 2007/0278061; 2008/0110715; 2008/0169166; 2008/0185253; 2008/0223681; 2009/0159391; and 2009/0211863.

For purposes of this application, the term coupling should be interpreted to include clutches or brakes wherein one of the plates is drivably connected to a torque delivery element of a transmission and the other plate is drivably connected to another torque delivery element or is anchored and held stationary with respect to a transmission housing. The terms coupling, clutch and brake may be used interchangeably.

One problem associated with such controllable one-way coupling assemblies is that the one-way clutch may inadvertently change (such as due to parasitic losses) from its overrun position or mode to its locked position or mode especially when the ambient temperature is well below 0° F. due to the highly viscous hydraulic fluid in the one-way clutch. Such a change could cause the clutch to fail.

SUMMARY OF THE INVENTION

An object of at least one embodiment of the present invention is to provide an improved overrunning coupling and control assembly including apparatus having a latching mechanism.

In carrying out the above object and other objects of at least one embodiment of the present invention, an apparatus for controlling an overrunning coupling assembly is provided. The assembly has a first member with a first surface, a second member with a second surface, a control element mounted for controlled shifting movement between the surfaces, and an actuator arm coupled to the control element to shift the control element along a shift direction from a first position which corresponds to a first mode of the coupling assembly to a second position which corresponds to a second mode of the coupling assembly and back to the first position. The apparatus includes a housing having an outer surface, an inner surface which defines a bore within the housing, a slot which is elongated in a direction substantially parallel to the shift direction and which extends between and fluidly communicates the inner and outer surfaces and a control port which extends between and fluidly communicates the inner and outer surfaces to transmit a control pressure signal into the housing. The apparatus further includes a piston disposed within the bore of the housing and having an outer surface in sliding contact with the inner surface of the housing and a groove formed in the outer surface of the piston to receive and retain a free end portion of the actuator arm therein. The apparatus still further includes at least one biasing member disposed within the bore of the housing to exert a biasing force on the piston. The apparatus further includes a latching mechanism to prevent the actuator arm from moving in a first direction substantially parallel to the shift direction within the slot in a locked condition of the mechanism in the first position of the control element. The control pressure signal within the housing changes the condition of the latching mechanism from locked to unlocked to unlock the actuator arm and causes the unlocked actuator arm to move along the first direction within the slot and the control element to move along the shift direction to the second position. The control pressure signal causes the piston to slide within the bore against the biasing force of the at least one biasing member. In the absence of a control pressure signal, the at least one biasing member moves the piston and thereby the unlocked actuator arm in a second direction opposite the first direction within the slot and the control element along the shift direction from the second position back to the first position to change the condition of the latching mechanism from unlocked to locked to lock the actuator arm.

The first position may be an overrun position, the first mode may be an overrun mode, the second position may be a locked position and the second mode may be a locked mode.

The latching mechanism may include a locking member and a spring which exerts a biasing force on the locking member to bias the latching mechanism into the locked condition.

The latching mechanism may be at least partially disposed within the piston in the locked condition of the latching mechanism.

The latching mechanism may include a locking member at least partially disposed within a recess of one of the members in the locked condition of the latching mechanism.

The latching mechanism may include a spring-biased latching piston movable between an extended position in the locked condition and a retracted position in the unlocked condition in response to the control pressure signal within the housing.

The latching mechanism may include a spring-biased locking ball movable between an extended position in the locked condition and a retracted position in the unlocked condition in response to the control pressure signal within the housing.

The latching mechanism may include a spring-biased locking strut movable between an extended position in the locked condition and retracted position in the unlocked condition in response to the control pressure signal within the housing.

The latching mechanism may include a spring-biased lock pin movable between an extended position in the locked condition and a retracted position in the unlocked condition in response to the control pressure signal within the housing.

The latching mechanism may include a locking piston movable between an extended position in the locked condition and a retracted position in the unlocked condition in response to the control pressure signal within the housing.

The latching mechanism may include a spring-biased locking end portion of the control element movable from an extended position in the locked condition and a retracted position in the unlocked condition in response to the control pressure signal within the housing.

The latching mechanism may include portions of the sidewalls of the groove formed in the outer surface of the piston and the free end portion of the actuating arm may be movable within the groove in response to the control pressure signal within the housing.

The free end portion of the actuating arm may move within the groove in a direction substantially parallel to the shift direction during movement of the piston within the housing.

The groove may be curved and the free end portion of the actuating arm may move within the groove in both a direction substantially parallel to the shift direction and in a direction substantially perpendicular to the shift direction during movement of the piston within the housing.

The piston may have a central axis and a plurality of regions which are substantially symmetric about the axis, and the piston may include a pair of cylindrically-shaped portions spaced apart along the axis and defining constant diameter regions and a frustum-shaped portion between the cylindrically-shaped portions and defining a sloped region, and the free end portion of the actuating arm may slide against the frustum-shaped portion to change the condition of the latching mechanism.

Still further in carrying out the above object and other objects of the present invention, an overrunning coupling and control assembly is provided. The assembly includes a first member with a first surface, a second member with a second surface and a control element mounted for controlled shifting movement between the surfaces. The assembly further includes an actuator arm coupled to the control element to shift the control element along a shift direction from a first position which corresponds to a first mode of the assembly to a second position which corresponds to a second mode of the assembly and back to the first position. The assembly still further includes a housing having an outer surface, an inner surface which defines a bore within the housing, a slot which is elongated in a direction substantially parallel to the shift direction and which extends between and fluidly communicates the inner and outer surfaces and a control port which extends between and fluidly communicates the inner and outer surfaces to transmit a control pressure signal into the housing. The assembly further includes a piston disposed within the bore of the housing and having an outer surface in sliding contact with the inner surface of the housing and a groove formed in the outer surface of the piston to receive and retain a free end portion of the actuator arm therein. The assembly still further includes at least one biasing member disposed within the bore of the housing to exert a biasing force on the piston. The assembly further includes a latching mechanism to prevent the actuator arm from moving in a first direction substantially parallel to the shift direction within the slot in a locked condition of the mechanism in the first position of the control element. The control pressure signal within the housing changes the condition of the latching mechanism from locked to unlocked to unlock the actuator arm and causes the unlocked actuator arm to move along the first direction within the slot and the control element to move along the shift direction to the second position. The control pressure signal causes the piston to slide within the bore against the biasing force of the at least one biasing member. In the absence of a control pressure signal, the at least one biasing member moves the piston and thereby the unlocked actuator arm in a second direction opposite the first direction within the slot and the control element along the shift direction from the second position back to the first position to change the condition of the latching mechanism from unlocked to locked to lock the actuator arm.

The first position may be an overrun position, the first mode may be an overrun mode, the second position may be a locked position and the second mode may be a locked mode.

The latching mechanism may include a locking member and a spring which exerts a biasing force on the locking member to bias the latching mechanism into the locked condition.

The latching mechanism may be at least partially disposed within the piston in the locked condition of the latching mechanism.

The latching mechanism may include a locking member at least partially disposed within a recess of one of the members in the locked condition of the latching mechanism.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a top plan view of an overrunning coupling or clutch assembly constructed in accordance with the prior art of U.S. Pat. No. 7,484,605;

FIG. 4 is a sectional view taken along lines 2-2 of FIG. 3;

FIG. 5 is a view, partially broken away, of a portion of the assembly of FIG. 3 without the external notch plate of the assembly and wherein in a slide or control plate lever may be moved clockwise to disengage a reverse strut or rocker;

DETAILED DESCRIPTION OF THE PREFERRED EMBODIMENT(S)

Figure 1:
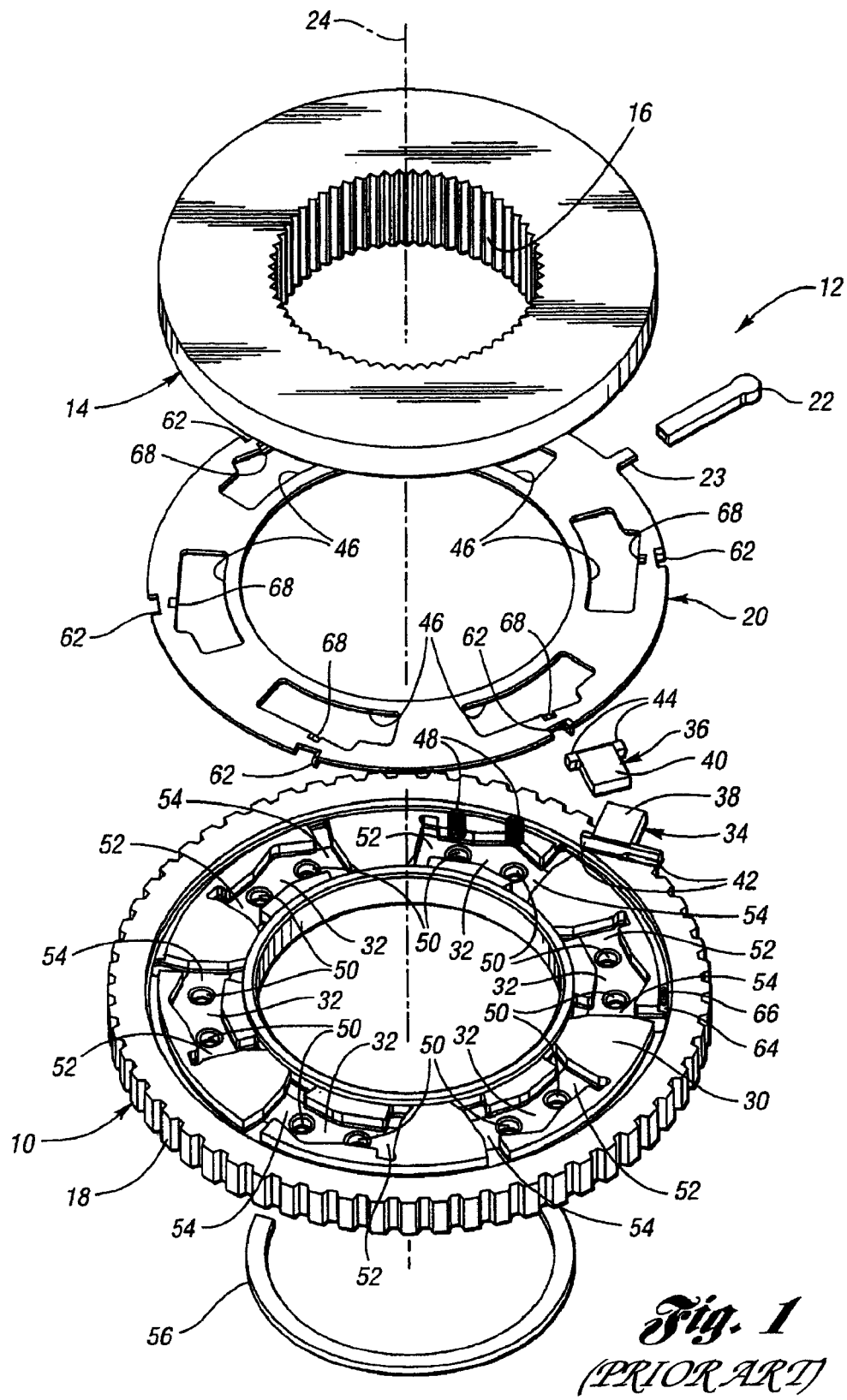
FIG. 1 is an exploded perspective view of an overrunning coupling or clutch assembly constructed in accordance with the prior art of U.S. Pat. No. 7,258,214.

Referring now to FIGS. 6-12c, there are illustrated various embodiments of a control apparatus for use in an overrunning coupling and control assembly. In general, the control apparatus controls an overrunning coupling assembly having a first member or plate with a first surface, a second member or plate with a second surface and a control element or plate mounted for controlled shifting movement between the surfaces. The coupling assembly also has an actuator arm or pin coupled to the control element to shift the control element along a shift direction from a first or overrun position which corresponds to a first or overrun mode of the coupling assembly to a second or locked position which corresponds to a second or locked mode of the coupling assembly and then back to the first position. Because the shift direction is typically only slightly curved, the shift direction may also be referred to herein as a "shift axis".

The apparatus generally includes a housing having an outer surface, an inner surface which defines a bore within the housing, and a slot which is elongated in a direction substantially parallel to the shift direction and which extends between and fluidly communicates the inner and outer surfaces. The housing also has a control port which extends between and fluidly communicates the inner and outer surfaces to transmit a control pressure signal into the housing.

In general, the apparatus further includes a piston disposed within the bore of the housing and having an outer surface in sliding contact with the inner surface of the housing. A groove or recess is formed in the outer surface of the piston to receive and retain a free end portion of the actuator arm therein.

The apparatus generally further includes one or more biasing members such as springs disposed within the bore of the housing to exert a biasing force on one end of the piston.

In general, the apparatus further includes a latching mechanism to prevent the actuator arm from moving in a first direction substantially parallel to the shift direction within the slot in a locked condition of the mechanism in the first position of the control element. The control pressure signal within the housing changes the condition of the latching mechanism from locked to unlocked to unlock the actuator arm and causes the unlocked actuator arm to move along the first direction within the slot and the control element to move along the shift direction to the second position. The control pressure signal causes the piston to slide within the bore against the biasing force of the at least one biasing member. In the absence of a control pressure signal, the at least one biasing member moves the piston and thereby the unlocked actuator arm in a second direction opposite the first direction within the slot and the control element along the shift direction from the second position back to the first position to change the condition of the latching mechanism from unlocked to locked to lock the actuator arm.

Figure 2:
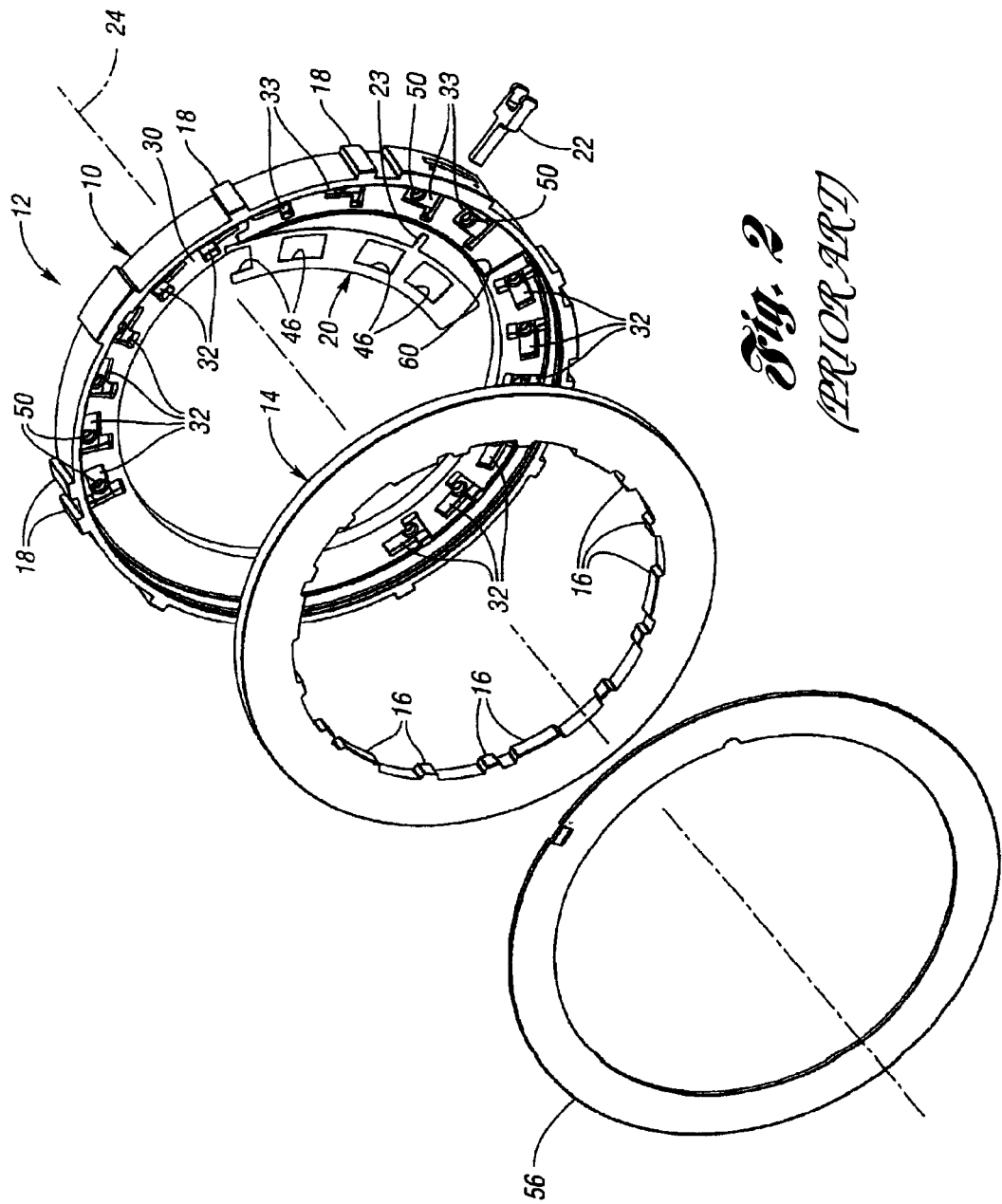
FIG. 2 is an exploded perspective view of an overrunning coupling or clutch assembly (without corresponding pawls and/or springs for purposes of simplicity) constructed in accordance with the prior art of U.S. Pat. No. 7,344,010.

As disclosed in various embodiments of the invention, the first position may be an overrun position, the first mode may be an overrun mode, the second position may be a locked position and the second mode may be a locked mode. However, other selectable or controllable clutches may also be controlled, such as the clutches of FIGS. 1 and 2. Also, a standard one-way clutch including a control plate may be provided wherein the OWC function is either turned "on" or turned "off" through the use of at least one embodiment of the present invention.

Figure 6:
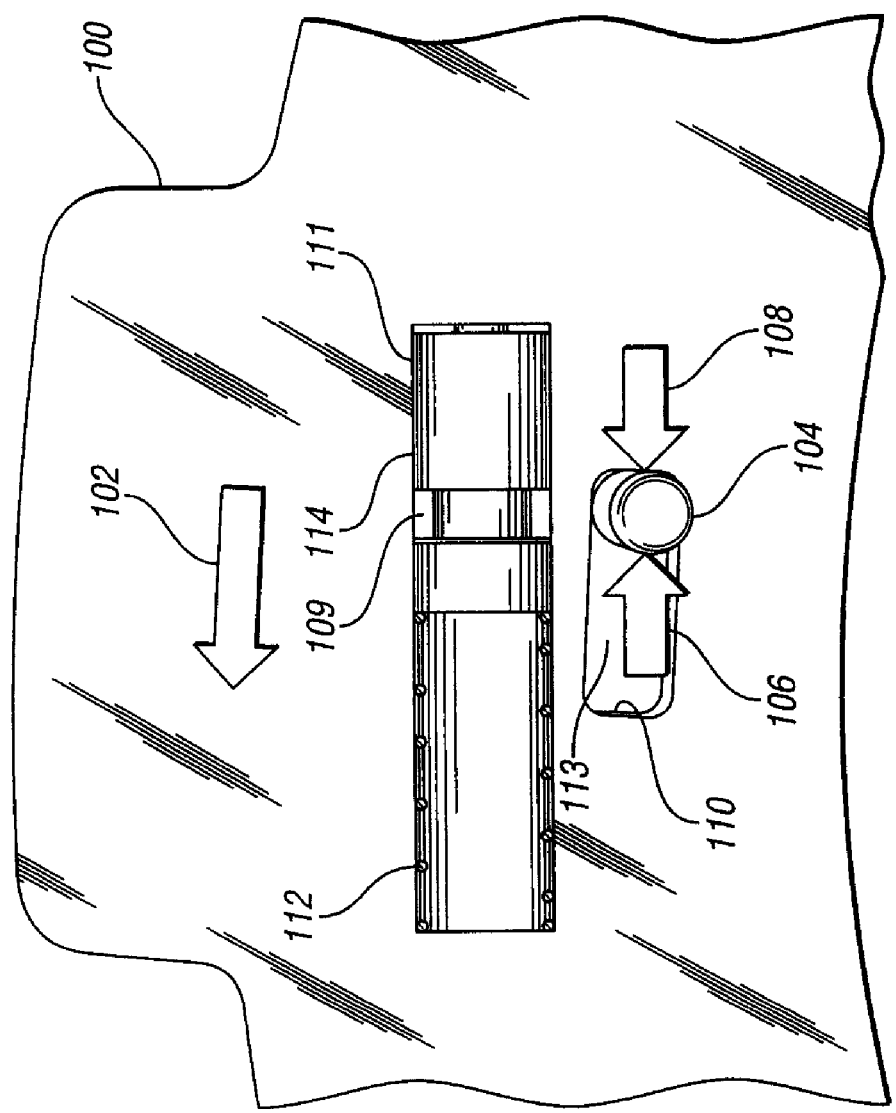
FIG. 6 is a schematic view, partially broken away, of a pocket plate with an actuating pin or arm extending through a slot therein and with various arrows and components of control apparatus constructed in accordance with at least one embodiment of the present invention superimposed on the pocket plate.

More specifically, FIG. 6 is a schematic view of a pocket plate 100 of an overrunning coupling or clutch assembly. The plate 100 has various arrows superimposed thereon. The topmost arrow 102 indicates an overrun rotation direction for a one-way clutch generally of the type illustrated in FIGS. 1-5 and of which the pocket plate 100 is a part. A compression spring force acting upon a control pin or actuator arm 104 of the clutch assembly is indicated by the leftmost bottom arrow 106. A shear force acting upon the pin 104 is indicated by the rightmost bottom arrow 108. A free end portion of the pin 104 is disposed within a groove or recess 109 formed in the outer surface 111 of a valve or piston 114. The opposite end portion (not shown) of the pin 104 is coupled to a control element or plate 113 of the clutch to move therewith. The pin 104 is indicated in the overrun condition of the clutch at one end of a slot 110 and is capable of moving in a leftward direction to the locked position or mode of the clutch at the opposite end of the slot 110 which is formed in the pocket plate 100.

In general, in each of the embodiments of the invention disclosed herein, a latching mechanism (not shown in FIG. 6) of control apparatus is provided to ensure that the one-way clutch does not inadvertently change from its overrun position to its locked position, especially when ambient temperatures fall below 0° F. due to the highly viscous hydraulic fluid or oil flowing into the controlled one-way clutch.

Each of the control apparatus described in FIGS. 7a-12c typically includes a compression or hard spring 112 which biases the valve or piston 114 of the apparatus so that the clutch is normally maintained in its overrun condition or mode. However, as noted above, when the ambient temperature is well below 0° F., the one-way clutch may inadvertently change from its overrun position to its locked position due to the highly viscous hydraulic fluid flowing into the one-way clutch upon start-up.

Figure 7A:
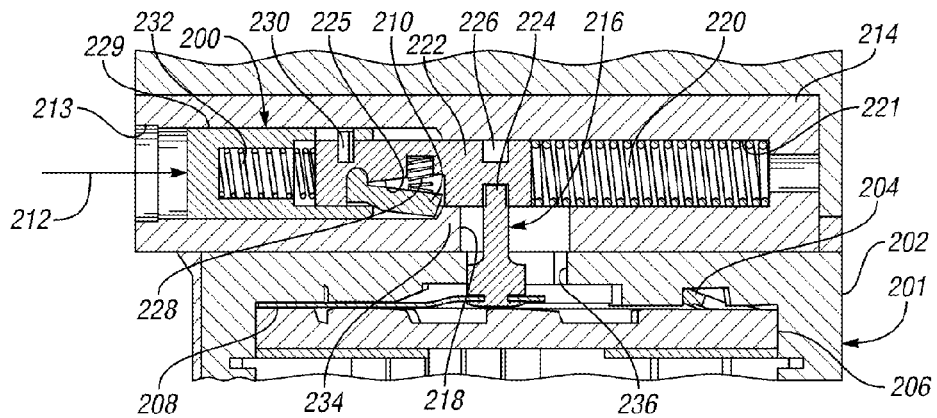
FIGS. 7a-7c are schematic views, partially broken away and in cross-section, of a coupling assembly and its control apparatus with a strut-detent latching mechanism in different control positions in the different views.
Figure 7B:
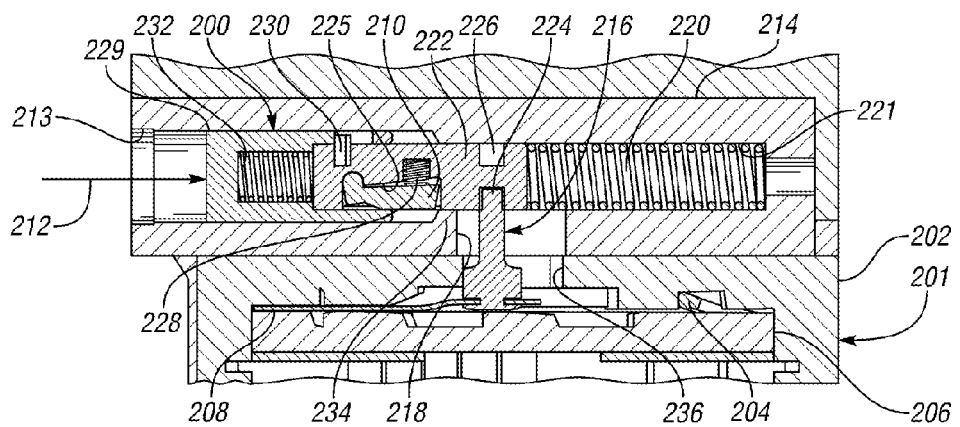
Figure 7C:
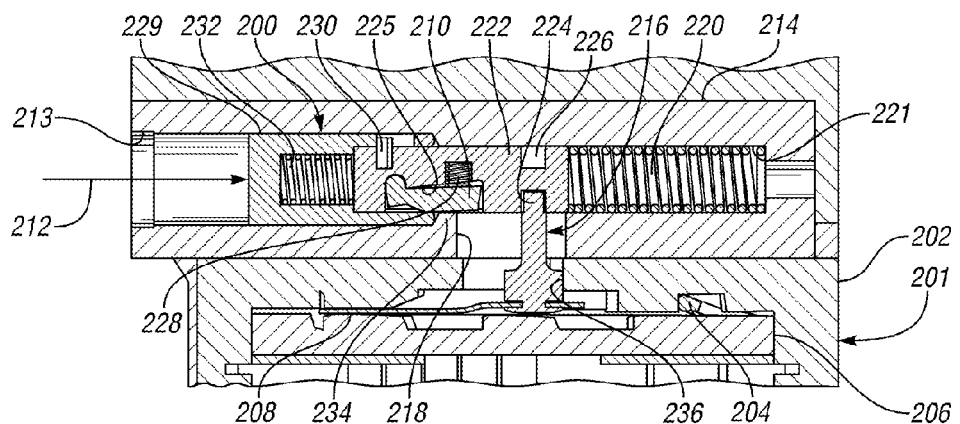

More specifically, FIGS. 7a-7c illustrate a "strut detent" latching mechanism, generally indicated at 200, constructed in accordance with one embodiment of the present invention. A one-way clutch, generally indicated at 201, is illustrated in its overrun position in FIG. 7a. The one-way clutch 201 includes a pocket plate 202 having struts 204 contained therein, a recess plate 206, and a control plate or element 208, all generally of the type disclosed in the one-way clutches of FIGS. 1-5. The latching mechanism 200 may include a spring-biased locking strut 210 movable between an extended position in a locked condition of the mechanism 200 and a retracted position in the unlocked condition of the mechanism 200 in response to the control pressure signal 212 which flows through a control port 213 which communicates a source of the signal (not shown) to the interior of a housing 214 of the control apparatus.

An actuating arm or pin, generally indicated at 216, is secured or coupled to the control plate 208 to move therewith and extends through a slot 218 formed in the housing 214 of the control apparatus. A compression spring or hard spring 220 disposed within a bore 221 of the housing 214 normally biases a valve or piston 222 also disposed within the bore 221 to its leftmost position as indicated in FIG. 7a. The actuating pin 216 includes a reduced diameter free end portion 224 which is held (i.e. received and retained) within a recess or groove 226 of the valve 222.

The strut detent latching mechanism 200 includes the strut 210 which is contained within a pocket 225 formed within the valve 222 and biased therein by a spring 228. In turn, the valve 222 is secured within a piston 229 by a locking pin 230 and is biased by a soft spring 232 to the right opposing the biasing of the hard spring 220.

Upon receiving the control pressure signal 212, the piston 229 moves to the right, thereby forcing the strut 210 downwardly into its pocket 226 and away from the blocking action of an inner shoulder 234 of the housing 214, thereby permitting the valve or piston 222 to move against the biasing action of the hard spring 220 as shown in FIG. 7b until the valve 222 moves the actuating pin 216 within the slot 218 and within a slot 236 formed in the pocket plate 202 to its rightmost position as illustrated in FIG. 7c, wherein the one-way clutch 201 is in its locked position. In this way, the latching mechanism 200 prevents inadvertent movement of the valve or piston 222 within the housing 214 due to highly viscous hydraulic fluid flowing into the one-way clutch 201 until a control pressure at 212 is exerted on the piston 229.

Referring now to FIGS. 8a-8f, there is illustrated a second embodiment of a latching mechanism entitled a "ball detent" latching mechanism, generally indicated at 300, for a one-way clutch, generally indicated at 301, including, as before, a pocket plate 302 having struts 303, a recess plate 304, and a control plate 306 therebetween. The latching mechanism 300 may include a spring-biased locking ball 308 movable between an extended position in a locked condition of the mechanism 300 and a retracted position in the unlocked condition of the mechanism 300 in response to the control pressure signal 310 which is transmitted through a control port 311 and into a housing 312 of control apparatus for the clutch 301.

Figure 8A:
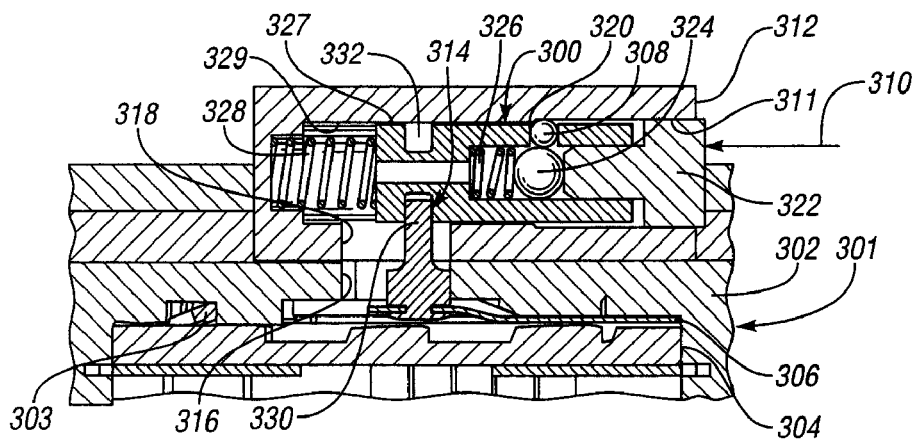
FIGS. 8a-8c are schematic views, partially broken away and in cross-section, of a coupling assembly and its control apparatus with a first type ball-detent latching mechanism in different control positions in the different views.
Figure 8B:
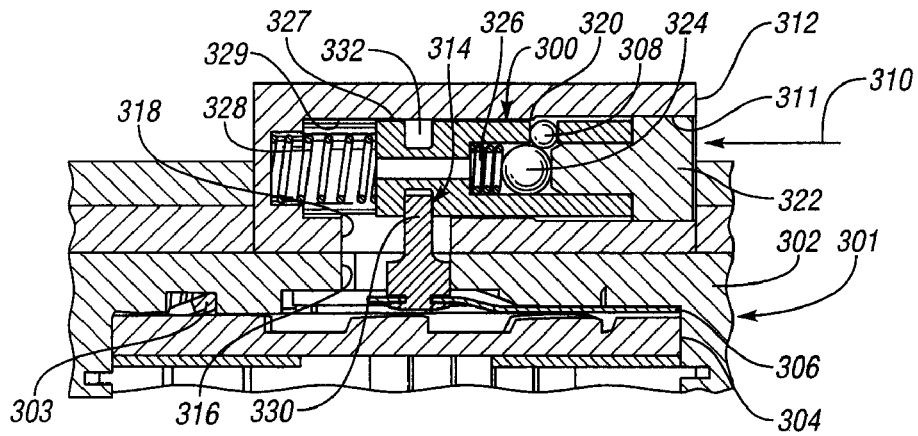
Figure 8C:
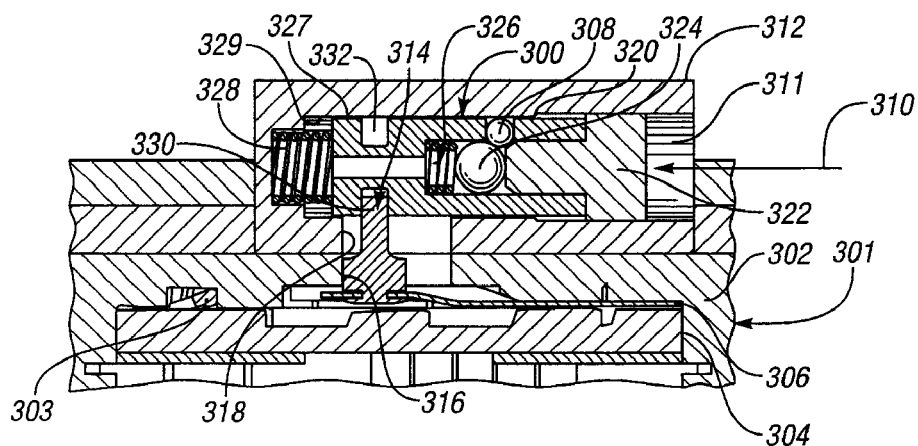

As before, an actuating arm or pin, generally indicated at 314, is secured to the control plate 306 to move the control plate 306 between the pocket plate 302 and the recess plate 304 upon movement of the pin 314 within a slot 316 which extends through the pocket plate 304 and through an aligned slot 318 formed in the housing 312 of the control apparatus. FIG. 8a illustrates an overrun position of the one-way clutch 301, wherein the latching mechanism 300 is in its locked condition by the locking ball 308 which engages a shoulder 320 of the housing 312. Upon receiving the control pressure signal 310, a piston 322 of the mechanism 300 moves to the left, thereby moving a relatively large, force-transmitting ball 324 to the left against the biasing action of a soft spring 326. Movement of the force-transmitting ball 324 to the left allows the locking ball 308 to move downwardly or radially inward to thereby allow a valve or piston 327 to move against the biasing action of a hard compression spring 328 (both of which are disposed within a bore 329 of the housing 312) which, in turn, causes the actuating pin 314 to move to its leftmost position as illustrated in FIG. 8c. As described herein, the word "downwardly" and the phrase "radially inward" may be used interchangeably depending on the context. A reduced diameter portion 330 of the actuating pin 314 is disposed within a pin recess or groove 332 of the valve 327. FIG. 8c illustrates the locked position of the one-way clutch 301.

Figure 8D:
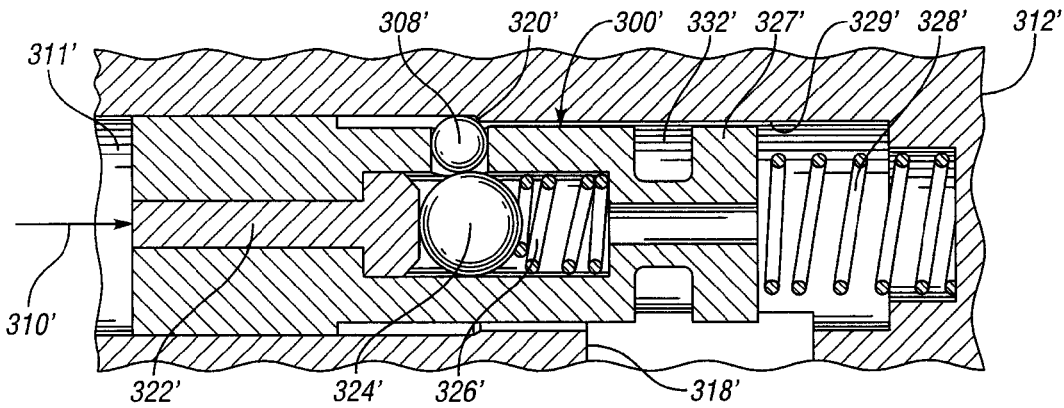
FIGS. 8d-8f are schematic views, partially broken away and in cross-section, of a coupling assembly and its control apparatus with a second type of ball-detent latching mechanism in different control positions in the different views.
Figure 8E:
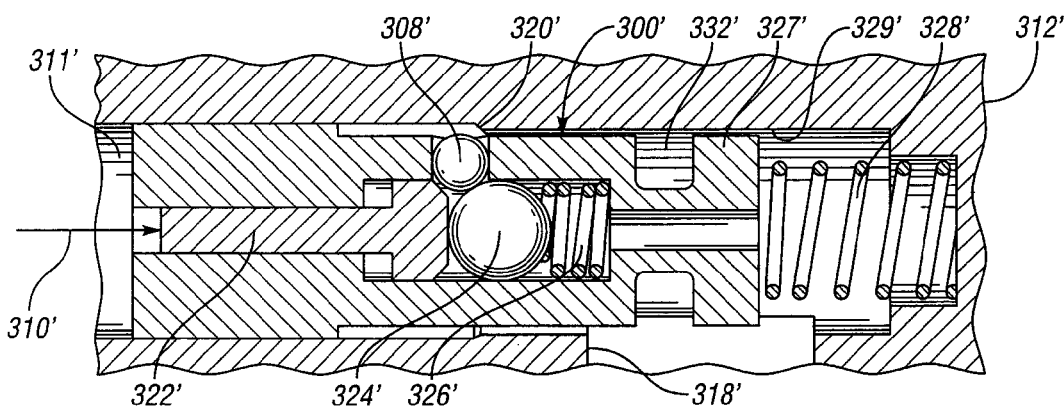
Figure 8F:
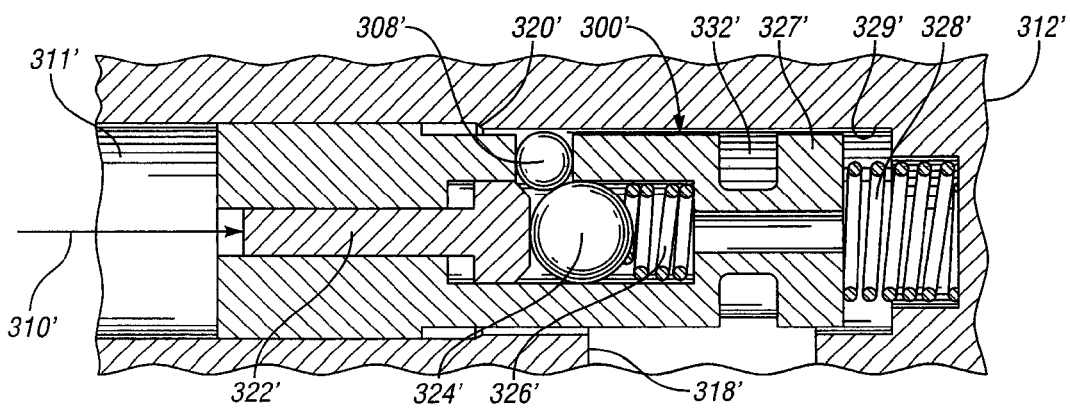

FIGS. 8d-8f are enlarged views of a second embodiment of a "ball detent" latching mechanism 300', wherein in this embodiment control pressure is applied at 310' through control port 311' to exert pressure on a piston 322' which engages the relatively large force-transmitting ball 324' against the biasing action of a soft spring 326'. Components of FIGS. 8d-8f which are the same or have the same or similar functions as the components of FIGS. 8a-8c are given the same reference number but a single prime designation. Movement of the relatively large ball 324' to the right against spring 326' allows a relatively small locking ball 308' to move downwardly and away from a shoulder 320' of the housing 312' to permit a valve 327' to move to the right against the biasing action of a hard compression spring 328' (both of which are disposed within a bore 329'), thereby moving the actuating pin (not shown) disposed within a pin recess 332' to move from left to right within a groove 318' formed in the housing 312'. FIG. 8d discloses the position of the latching mechanism 300' in the overrun position of a one-way clutch (not shown) and FIG. 8f discloses the position of the latching mechanism 300' in the locked position of the clutch (not shown but substantially identical to the clutch 301 of FIGS. 8a-8c).

Figure 9A:
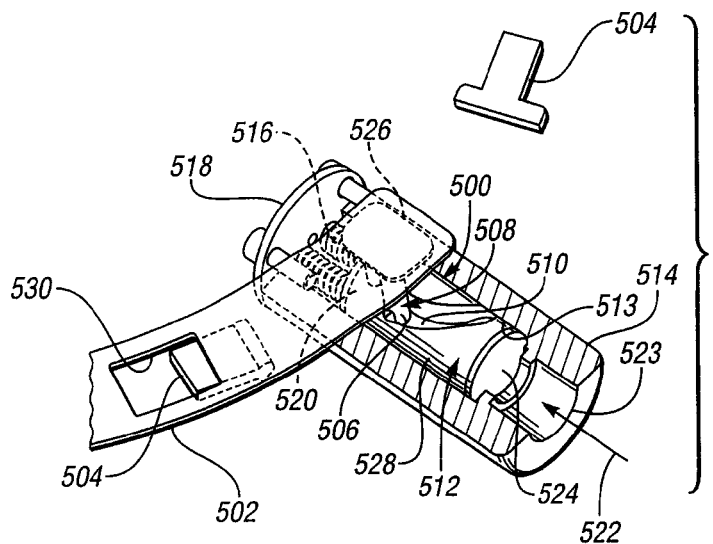
FIGS. 9a-9c are schematic views, partially broken away and in cross-section, of a control element with associated struts and its control apparatus in the form of a perpendicular actuating shift valve or piston (latching mechanism) in different control positions in the different views.
Figure 9B:
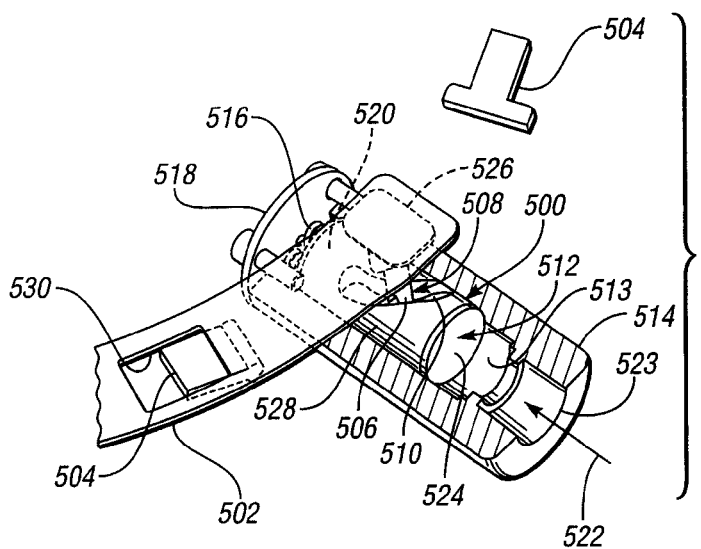
Figure 9C:
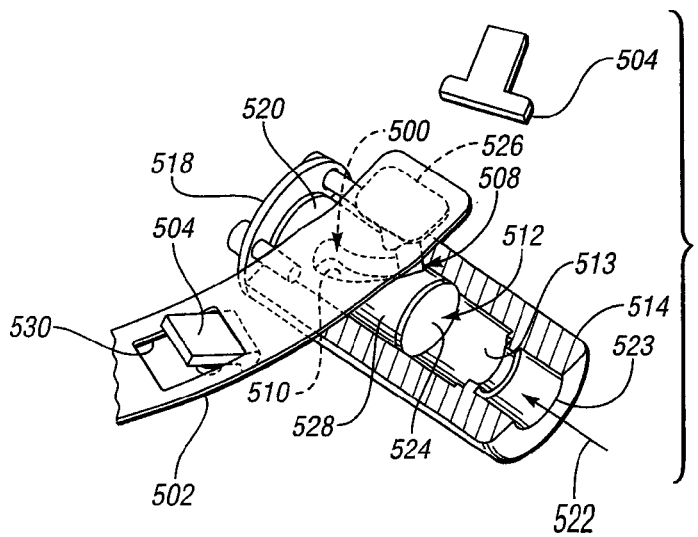

Referring now to FIGS. 9a-9c, there is illustrated a "perpendicular actuating shift valve" latching mechanism, generally indicated at 500, of yet another embodiment of the present invention. Again, a control plate or element 502 of a one-way clutch is provided which shifts or slides along a shift direction between pocket and recess plates (not shown) of the clutch to controllably cover and uncover struts 504 which are spring-biased within the pocket plate. A free end portion 506 of an actuating arm or pin, generally indicated at 508, may move within a curved pin recess or groove 510 formed in an outer surface 528 of a valve or piston, generally indicated at 512, in a direction substantially perpendicular to a shift direction of the control plate 502 during sliding movement of the piston or valve 512 within a bore 513 formed in a housing 514. The side walls or surfaces of the groove 510 lock the pin 508 therebetween as shown in FIG. 9a to prevent movement of the pin 508 in a direction parallel to the shift direction of the control plate 502.

The groove 510 may be curved and the free end portion 506 of the actuating arm 508 may simultaneously move within the groove 510 in both a direction substantially parallel to the shift axis and in a direction substantially perpendicular to the shift axis during movement of the piston 512 within the housing 514.

Figure 10A:
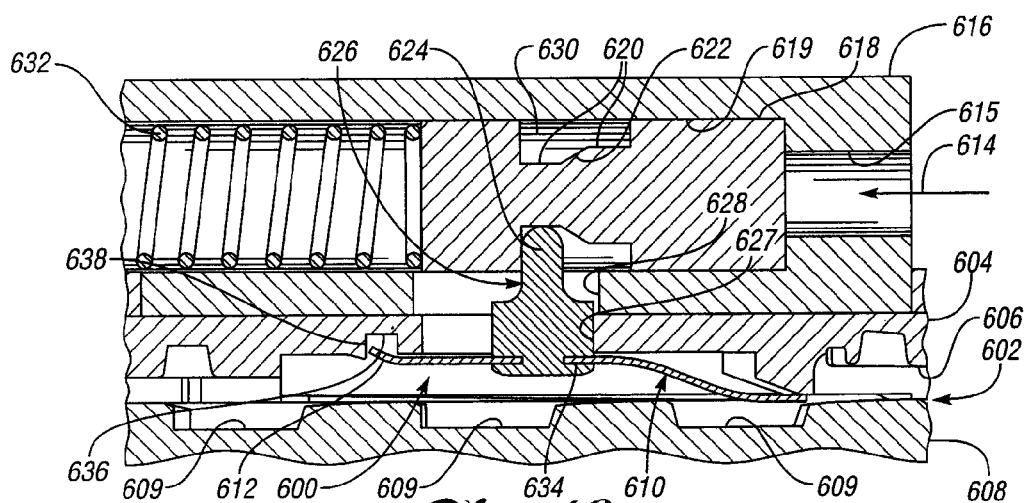
FIGS. 10a-10e are schematic views, partially broken away and in cross-section, of a coupling assembly and its control apparatus with an edge-detent latching mechanism in different control positions in the different views.
Figure 10B:
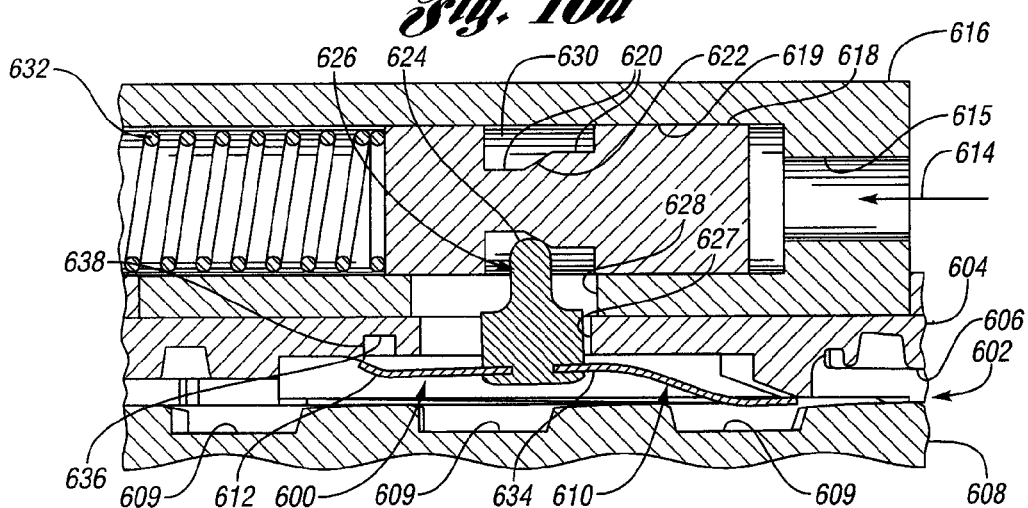
Figure 10C:
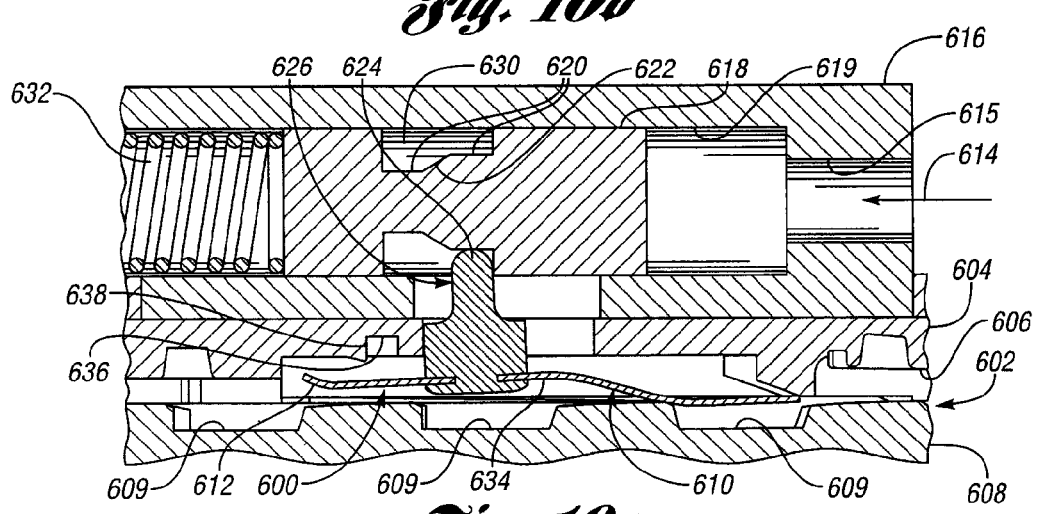
Figure 10D:
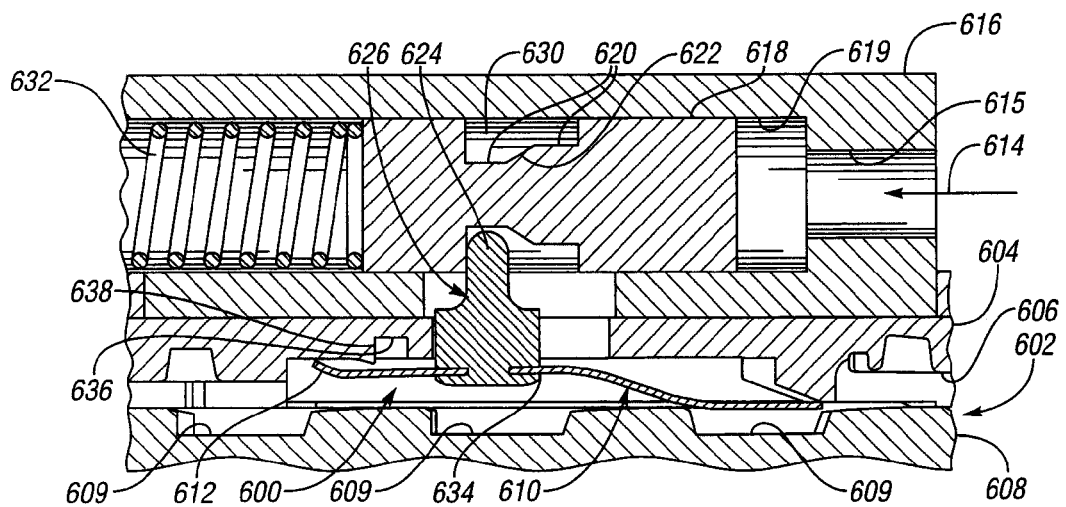
Figure 10E:
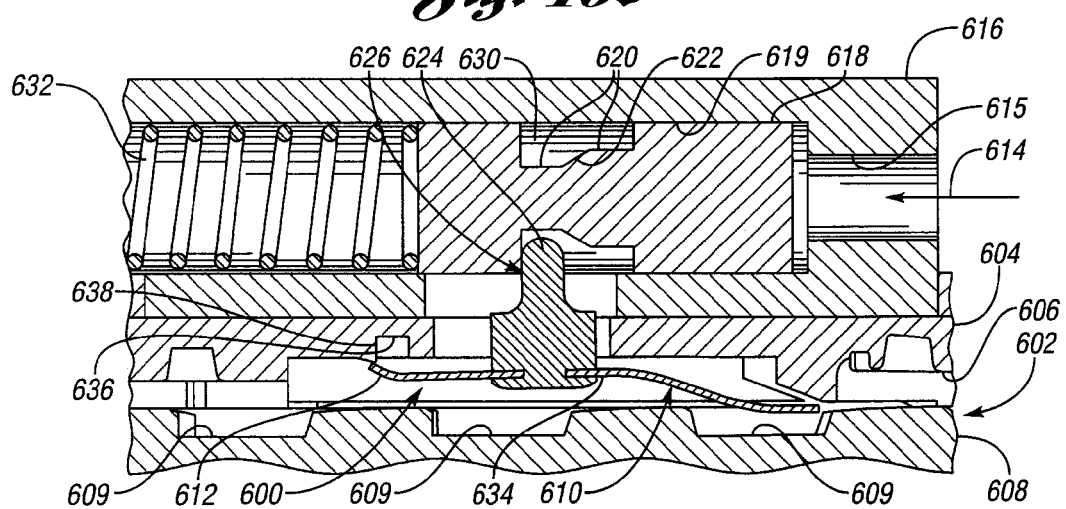

Compression springs 516, also disposed within the bore 513, are biased between a cover 518 of the housing 514 and one end 520 of the valve 512. The plate 502 of the one-way clutch is disclosed in its overrun position in FIG. 9a and moves to its locked position in FIG. 9c. Application of a control pressure 522 through a control port 523 of the housing 514 at the opposite end 524 of the valve or piston 512 causes the valve 512 to move against the biasing action of the compression springs 516 so that the actuating pin 508, which is secured to the control plate 502 at a pin attachment portion 526, moves within the curved pin recess or groove 510 formed in the outer surface 528 of the valve 512 as shown in FIGS. 10b and 10c. As shown in FIG. 9c, one of the struts 504 now extends through an aperture 530 formed in the control plate 502 to lock the one-way clutch.

Referring now to FIGS. 10a-10e (with FIGS. 10a and 10e being substantially identical to illustrate a complete cycle), there is illustrated yet another embodiment of a latching mechanism, generally indicated at 600, constructed in accordance with the present invention in combination with a one-way clutch, generally indicated at 602, including a pocket plate 604 with struts (not shown) disposed within pockets 606, a recess plate 608 having recesses 609, and a deformable control plate or element, generally indicated at 610, disposed therebetween. The latching mechanism 600 may include a spring-biased locking end portion 612 of the control element 610 movable from an extended position in locked condition of the mechanism 600 and a retracted position in the unlocked condition of the mechanism 600 in response to the control pressure signal 614 which flows through a control port 615 and into a housing 616. A piston or valve 618 of the apparatus is disposed within a bore 619 of the housing 616 and the piston 618 has a central axis and a plurality of regions of the piston 618 are substantially symmetric about the axis. The piston 618 includes a pair of cylindrically-shaped portions 620 spaced apart along the axis and which define constant diameter regions. A frustum-shaped portion 622 of the piston 618 is located between the cylindrically-shaped portions 620 and defines a sloped region. A free end portion 624 of an actuating arm or pin, generally indicated at 626, of the clutch may slide against the frustum-shaped portion 622 to change the condition of the latching mechanism 600 from locked to unlocked as shown in FIG. 10b.

As previously mentioned, the recess plate 608 includes a plurality of the recesses 609 formed therein to receive edge portions of the struts (not shown) when the struts extend from their respective pockets 606 and through apertures (not shown) formed in the control plate 610. As before with respect to the other embodiments, the actuating pin 626 is connected to the control plate 610 to move therewith and extends through a slot 627 formed in the pocket plate 604 and an aligned slot 628 formed in a housing 616 of the control apparatus to engage the outer, reduced-diameter surface of the valve 618 which forms an angled pin recess or groove 630 in the valve 618. The valve 618, like in the other embodiments, is biased by a hard compression spring 632 (also disposed within the bore 619) to the right as illustrated in FIG. 10a, wherein the one-way clutch 602 is in its overrun position.

Figure 10F:
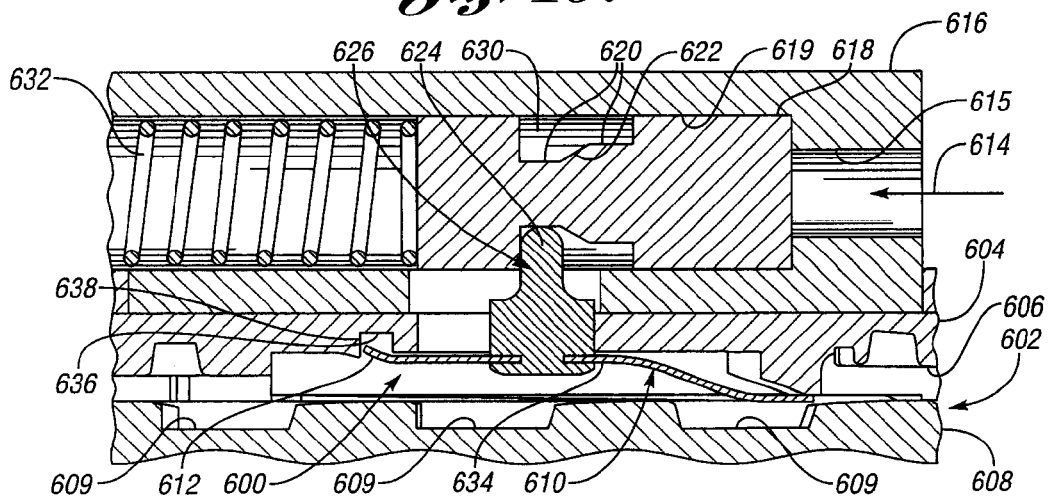

A spring portion 634 of the plate 610 is attached to the pin 626. As shown in FIGS. 10a and 10f, the end portion 612 of the spring portion 634 is disposed in a spring recess 636 formed in the pocket plate 604. In FIG. 10a, the end portion 612 engages a stop 638 of the plate 604 in the overrun position of the one-way clutch 602. Upon the application of the control pressure 614, the valve 618 moves to the left, thereby causing the distal or free end portion 624 of the actuating pin 626 to move along the outer contoured surface of the valve 618. During this movement, the actuating pin 626 moves the end portion 612 attached thereto out of the spring recess 636 and away from the stop 638, thereby allowing the actuating pin 626 to move through the various positions as illustrated in FIGS. 10a-10e. FIG. 10c shows the actuating pin 626 at its rightmost position within the angled pin recess 630, wherein the one-way clutch 602 is in its locked position and wherein the compression spring 632 is in its most compressed position. As the control pressure 614 is decreased in value, the valve 618 moves back to the right as illustrated by the drawing FIGS. 10c-10e within the housing 616, thereby allowing the pin 626 to move back to the position that it had as illustrated in FIG. 10a and to bring the spring end portion 612 back into the recess 636, as illustrated in FIGS. 10a and 10f. End portion 612 engages the stop 638 if overrun drag pushes the plate 610 up against the stop 638.

Figure 11A:
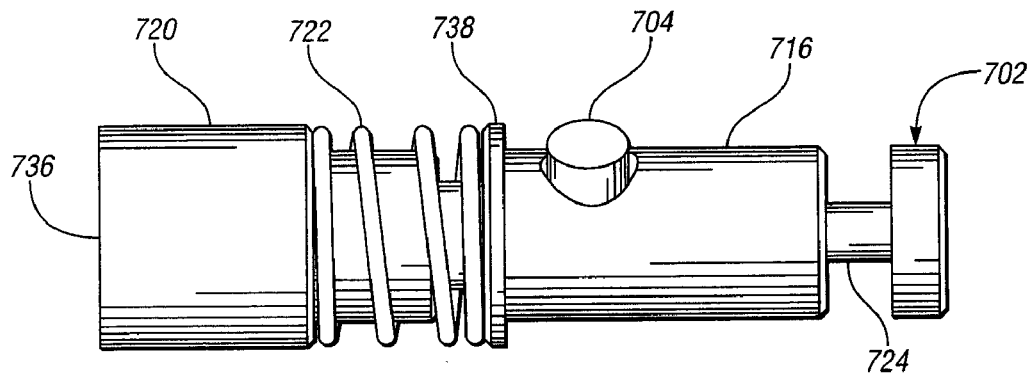
FIGS. 11a-11c are schematic views (FIG. 11b being broken away and in cross-section) of different parts of a lock pin detent mechanism.

Referring now to FIGS. 11a-11f, there is illustrated yet another embodiment of a "lock pin detent" latching mechanism, generally indicated at 700, wherein a lock pin detent assembly, generally indicated at 702, is illustrated in FIG. 11a. The latching mechanism 700 may include a spring-biased lock pin or locking part 704 movable between an extended position in a locked condition of the mechanism 700 and a retracted position in the unlocked condition of the mechanism 700 in response to a control pressure signal 706 which enters a bore 707 formed in a housing 708 through a control port 709.

Figure 11B:
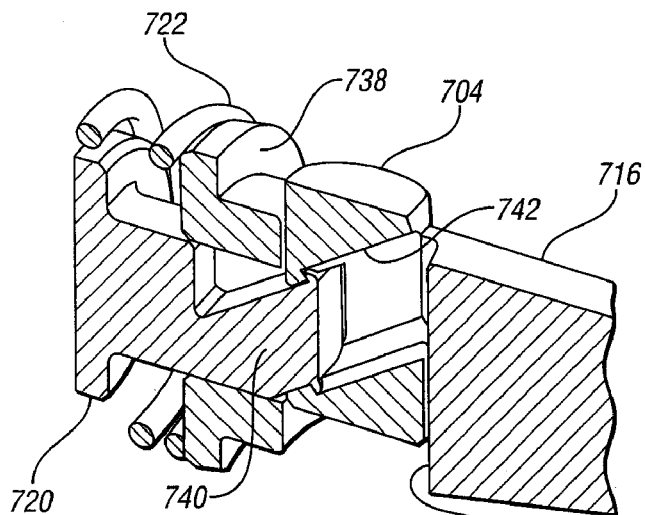
Figure 11C:
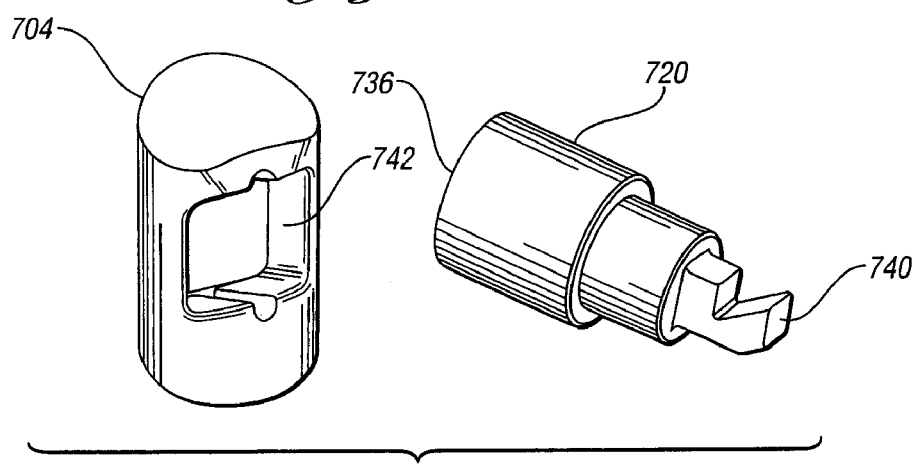
Figure 11D:
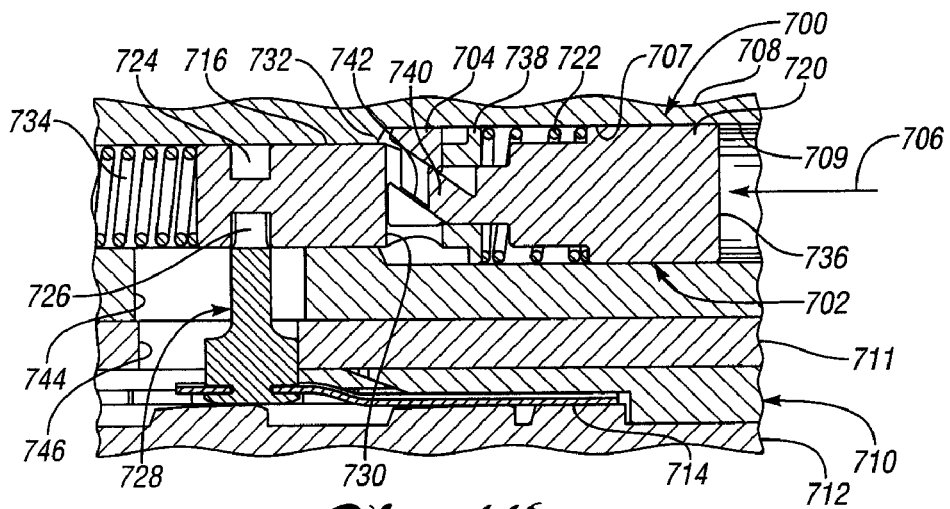
FIGS. 11d-11f are schematic views, partially broken away and in cross-section, of a coupling assembly and its control apparatus with the mechanism of FIGS. 11a-11c in different control positions in the different views.
Figure 11E:
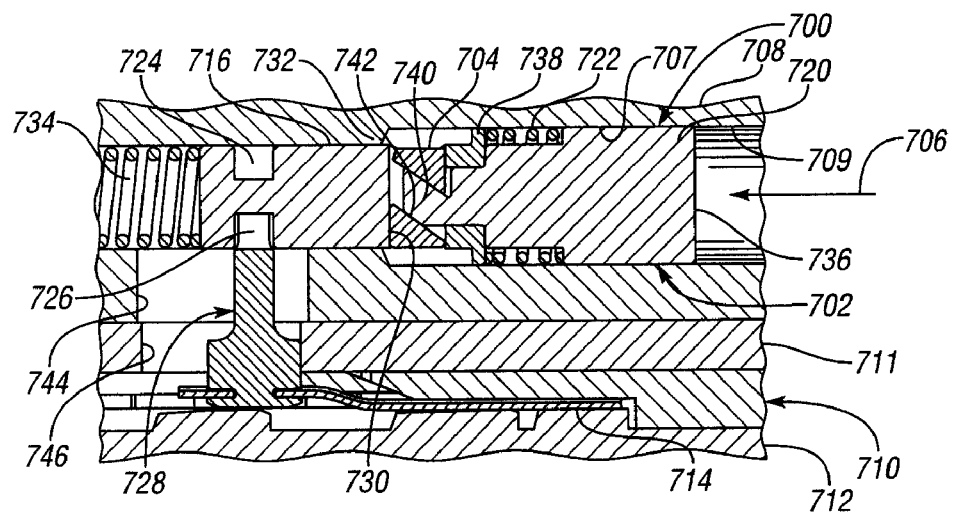
Figure 11F:
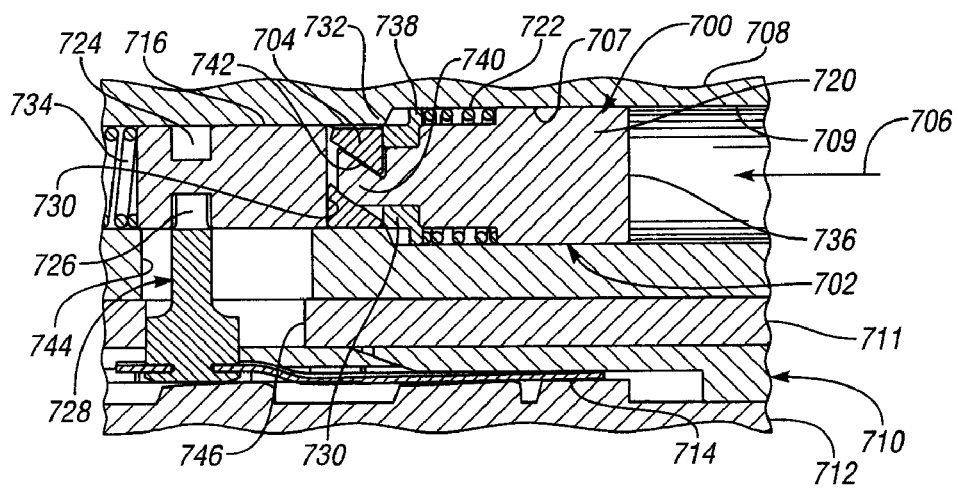

Referring to FIG. 11d, the lock pin detent latching mechanism 700 is coupled, as before, to a one-way clutch, generally indicated at 710, including a pocket plate 711, a recess plate 712, and a control plate or element 714 disposed therebetween for sliding movement to cause the one-way clutch 710 to move from its overrun position as illustrated in FIG. 11d to its locked position as illustrated in FIG. 11f. The valve assembly 702, as illustrated in detail in FIGS. 11a-11c, is disposed in a bore 707 within the housing 708 and includes a pin actuating part 716 or piston, the locking part 704, and a pressure part 720 biased away from the pin actuating part 716 by a soft spring 722.

The pin actuating part or piston 716 includes a pin recess 724 which receives and retains a reduced diameter portion 726 of an actuating pin 728. The pin actuating part 716 includes a vertical slide hole 730 in which there is slidably mounted the locking part 704 which is movable within the vertical slide hole 730 between the position shown in FIG. 12d in which the part 704 engages a shoulder 732 of the housing 708 to prevent movement of the assembly 702 to the left against the biasing action of a hard compression spring 734, thereby preventing inadvertent movement of the one-way clutch 710 from its overrun position illustrated in FIG. 11d to its locked position as illustrated in FIG. 11f.

Upon application of control pressure 706 at a pressure receiving piston portion 736 of the pressure part 720, the pressure part 720 initially moves to the left as illustrated in FIG. 11d against the biasing action of the soft spring 722 which extends between a spring biasing part 738 and the pressure part 720. Further movement of the pressure part 720 causes an actuating portion 740 of the pressure part 720 to move within an angled slide hole 742 of the locking part 704, thereby causing the locking part 704 to move downwardly to allow the entire valve assembly 702 to move further to the left, thereby causing the actuating pin 728 to move within a slot 744 in the housing 708 and within an aligned slot 746 in the pocket plate 711 and, consequently, the control plate 714 to move to the left to the locked position of the one-way clutch 710 as illustrated in FIG. 11f.

Figure 12A:
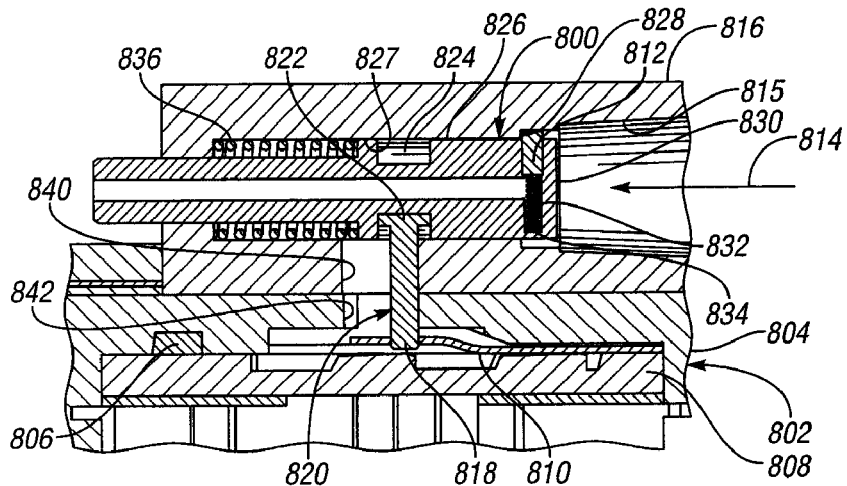
FIGS. 12a-12c are schematic views, partially broken away and in cross-section, of a coupling assembly and its control apparatus with a latching piston latching mechanism in different control positions in the different views.
Figure 12B:
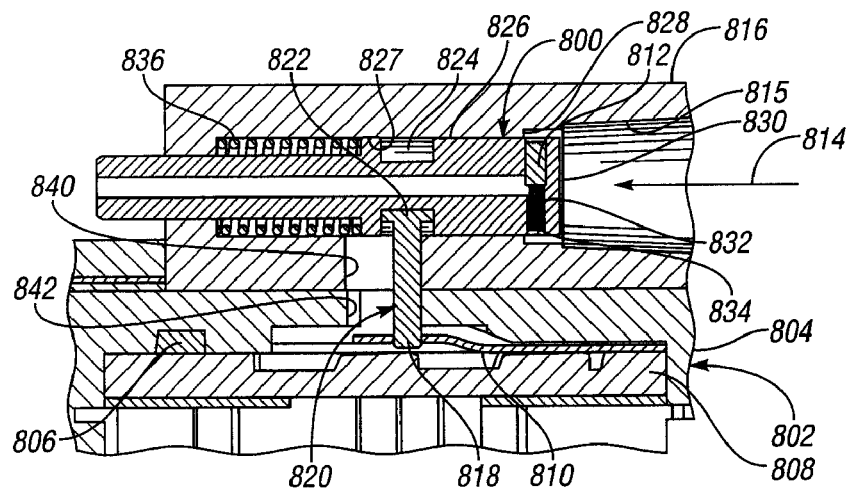
Figure 12C:
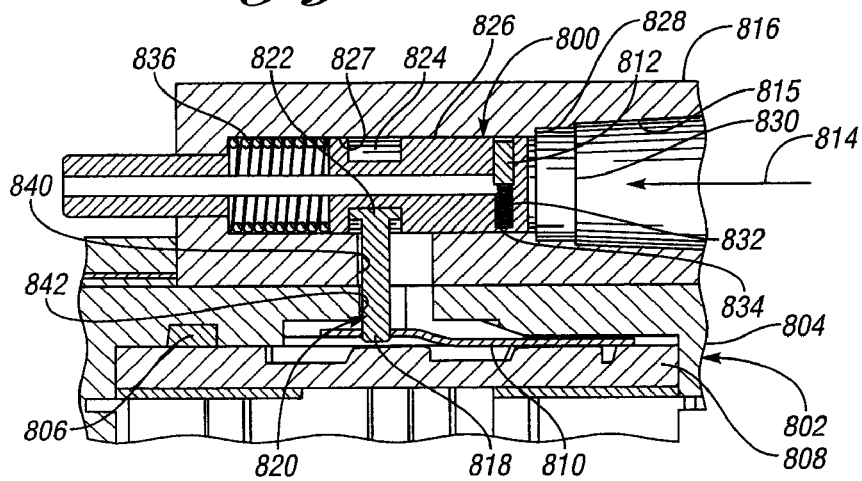

Referring now to FIGS. 12a-12c, there is illustrated still yet another embodiment of a latching mechanism, generally indicated at 800, entitled a "latching piston design" for a one-way clutch, generally indicated at 802, which also includes a pocket plate 804 with struts 806, a recess plate 808, and a control plate 810 slidably disposed therebetween so that the one-way clutch 802 can move from its overrun position as illustrated in FIG. 12a to its locked position as illustrated in FIG. 12c. The latching mechanism 800 includes a spring-biased latching piston 812 movable between an extended position in the locked condition of the mechanism 800 and a retracted position of the mechanism 800 in the unlocked condition in response to a control pressure signal 814 which is transmitted through a port 815 within the housing 816 and into a housing bore 827.

An end portion 818 of an actuating pin, generally indicated at 820, is secured to the control plate 810 to move therewith. The actuating pin 820 includes a head portion 822 disposed within a pin recess 824 contained within an outer surface of a valve or piston 826 of the control apparatus. The valve 826 is slidably disposed within the bore 827 in the housing 816.

The latching piston 812 is shown in FIG. 12a in abutting engagement against a shoulder 828 of the housing 816 to prevent movement of the valve 826 leftward as shown in FIG. 12a. Application of the control pressure 814 at one end surface 830 of the valve 826 causes the latching piston 812 to move downwardly against the biasing action of a latching piston spring 832 disposed within a spring recess 834 formed in the valve 826 to allow the valve 826 to move leftward against the biasing action of a hard spring 836 (also disposed within the bore 827) to, in turn, cause the actuating pin 820 to move to the left within a slot 840 formed within the housing 816 and within an aligned slot 842 formed in the pocket plate 804, thereby moving the control plate 810 leftward so that the one-way clutch 802 moves to its locked position as shown in FIG. 12c.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Apparatus for controlling an overrunning coupling assembly having a first member with a first surface, a second member with a second surface, a control element mounted for controlled shifting movement between the surfaces, and an actuator arm coupled to the control element to shift the control element along a shift direction from a first position which corresponds to a first mode of the coupling assembly to a second position which corresponds to a second mode of the coupling assembly and back to the first position, the apparatus comprising:

a housing having an outer surface, an inner surface which defines a bore within the housing, a slot which is elongated in a direction substantially parallel to the shift direction and which extends between and fluidly communicates the inner and outer surfaces and a control port which extends between and fluidly communicates the inner and outer surfaces to transmit a control pressure signal into the housing;

a piston disposed within the bore of the housing and having an outer surface in sliding contact with the inner surface of the housing and a groove formed in the outer surface of the piston to receive and retain a free end portion of the actuator arm therein;

at least one biasing member disposed within the bore of the housing to exert a biasing force on the piston; and a latching mechanism to prevent the actuator arm from moving in a first direction substantially parallel to the shift direction within the slot in a locked condition of the mechanism in the first position of the control element, the control pressure signal within the housing changing the condition of the latching mechanism from locked to unlocked to unlock the actuator arm and causing the unlocked actuator arm to move along the first direction within the slot and the control element to move along the shift direction to the second position, the control pressure signal causing the piston to slide within the bore against the biasing force of the at least one biasing member and wherein, in the absence of a control pressure signal, the at least one biasing member moves the piston and thereby the unlocked actuator arm in a second direction opposite the first direction within the slot and the control element along the shift direction from the second position back to the first position to change the condition of the latching mechanism from unlocked to locked to lock the actuator arm.

2. The apparatus as claimed in claim 1, wherein the first position is an overrun position, the first mode is an overrun mode, the second position is a locked position, and the second mode is a locked mode.

3. The apparatus as claimed in claim 1, wherein the latching mechanism includes a locking member and a spring which exerts a biasing force on the locking member to bias the latching mechanism into the locked condition.

4. The apparatus as claimed in claim 1, wherein the latching mechanism is at least partially disposed within the piston in the locked condition of the latching mechanism.

5. The apparatus as claimed in claim 1, wherein the latching mechanism includes a locking member at least partially disposed within a recess of one of the members in the locked condition of the latching mechanism.

6. The apparatus as claimed in claim 1, wherein the latching mechanism includes a spring-biased latching piston movable between an extended position in the locked condition and a retracted position in the unlocked condition in response to the control pressure signal within the housing.

7. The apparatus as claimed in claim 1, wherein the latching mechanism includes a spring-biased locking ball movable between an extended position in the locked condition and a retracted position in the unlocked condition in response to the control pressure signal within the housing.

8. The apparatus as claimed in claim 1, wherein the latching mechanism includes a spring-biased locking strut movable between an extended position in the locked condition and retracted position in the unlocked condition in response to the control pressure signal within the housing.

9. The apparatus as claimed in claim 1, wherein the latching mechanism includes a spring-biased lock pin movable between an extended position in the locked condition and a retracted position in the unlocked condition in response to the control pressure signal within the housing.

10. The apparatus as claimed in claim 1, wherein the latching mechanism includes a locking piston movable between an extended position in the locked condition and a refracted position in the unlocked condition in response to the control pressure signal within the housing.

11. The apparatus as claimed in claim 1, wherein the latching mechanism includes a spring-biased locking end portion of the control element movable from an extended position in the locked condition and a retracted position in the unlocked condition in response to the control pressure signal within the housing.

12. The apparatus as claimed in claim 1, wherein the latching mechanism includes portions of the sidewalls of the groove formed in the outer surface of the piston and wherein the free end portion of the actuating arm is movable within the groove in response to the control pressure signal within the housing.

13. The apparatus as claimed in claim 1, wherein the free end portion of the actuating arm moves within the groove in a direction substantially parallel to the shift direction during movement of the piston within the housing.

14. The apparatus as claimed in claim 1, wherein the groove is curved and wherein the free end portion of the actuating arm moves within the groove in both a direction substantially parallel to the shift direction and in a direction substantially perpendicular to the shift direction during movement of the piston within the housing.

15. The apparatus as claimed in claim 11, wherein the piston has a central axis and a plurality of regions which are substantially symmetric about the axis, and wherein the piston includes a pair of cylindrically-shaped portions spaced apart along the axis and defining constant diameter regions and a frustum-shaped portion between the cylindrically-shaped portions and defining a sloped region, and wherein the free end portion of the actuating arm slides against the frustum-shaped portion to change the condition of the latching mechanism.

16. Overrunning coupling and control assembly comprising:

a first member with a first surface;

a second member with a second surface;

a control element mounted for controlled shifting movement between the surfaces;

an actuator arm coupled to the control element to shift the control element along a shift direction from a first position which corresponds to a first mode of the assembly to a second position which corresponds to a second mode of the assembly and back to the first position;

a housing having an outer surface, an inner surface which defines a bore within the housing, a slot which is elongated in a direction substantially parallel to the shift direction and which extends between and fluidly communicates the inner and outer surfaces and a control port which extends between and fluidly communicates the inner and outer surfaces to transmit a control pressure signal into the housing;

a piston disposed within the bore of the housing and having an outer surface in sliding contact with the inner surface of the housing and a groove formed in the outer surface of the piston to receive and retain a free end portion of the actuator arm therein;

at least one biasing member disposed within the bore of the housing to exert a biasing force on the piston; and a latching mechanism to prevent the actuator arm from moving in a first direction substantially parallel to the shift direction within the slot in a locked condition of the mechanism in the first position of the control element, the control pressure signal within the housing changing the condition of the latching mechanism from locked to unlocked to unlock the actuator arm and causing the unlocked actuator arm to move along the first direction within the slot and the control element to move along the shift direction to the second position, the control pressure signal causing the piston to slide within the bore against the biasing force of the at least one biasing member and wherein in the absence of a control pressure signal the at least one biasing member moves the piston and thereby the unlocked actuator arm in a second direction opposite the first direction within the slot and the control element along the shift direction from the second position back to the first position to change the condition of the latching mechanism from unlocked to locked to lock the actuator arm.

17. The assembly as claimed in claim 16, wherein the first position is an overrun position, the first mode is an overrun mode, the second position is a locked position, and the second mode is a locked mode.

18. The assembly as claimed in claim 16, wherein the latching mechanism includes a locking member and a spring which exerts a biasing force on the locking member to bias the latching mechanism into the locked condition.

19. The assembly as claimed in claim 16, wherein the latching mechanism is at least partially disposed within the piston in the locked condition of the latching mechanism.

20. The assembly as claimed in claim 16, wherein the latching mechanism includes a locking member at least partially disposed within a recess of one of the members in the locked condition of the latching mechanism.

* * * * *